United States Patent [19]

Hattwig

[11] Patent Number: 4,740,039
[45] Date of Patent: Apr. 26, 1988

[54] HYDRAULIC DUAL-CIRCUIT BRAKE SYSTEM FOR AUTOMOBILES

[75] Inventor: Peter Hattwig, Cremlingen, Fed. Rep. of Germany

[73] Assignee: Volkswagenwerk Aktiengesellschaft, Wolfsburg, Fed. Rep. of Germany

[21] Appl. No.: 915,869

[22] Filed: Oct. 7, 1986

Related U.S. Application Data

[63] Continuation of Ser. No. 719,682, Apr. 4, 1985, abandoned.

[30] Foreign Application Priority Data

Apr. 17, 1984 [DE] Fed. Rep. of Germany ....... 3414427

[51] Int. Cl.$^4$ ............................ B60T 13/00; B60T 8/34
[52] U.S. Cl. ................................ 303/6 C; 188/151 A; 188/349; 303/113; 303/119
[58] Field of Search ....... 303/6 C, 6 R, 111, 113–119, 303/61–63, 68–69, 92, 98, 89, 100; 188/349, 151 A, 181 A, 11, 345, 353

[56] References Cited

U.S. PATENT DOCUMENTS

| 3,525,552 | 8/1970 | Oberthür | 303/6 C |
|---|---|---|---|
| 3,671,085 | 6/1972 | Pasek et al. | 303/115 |
| 3,674,317 | 7/1972 | Mangold | 303/118 |
| 3,724,915 | 4/1973 | MacDuff | 303/115 |
| 3,804,468 | 4/1974 | Ishikawa et al. | 303/6 C |
| 4,022,514 | 5/1977 | Kondo et al. | 303/117 X |
| 4,050,748 | 9/1977 | Belart | 303/115 X |
| 4,229,049 | 10/1980 | Ando | 303/6 C |
| 4,421,362 | 12/1983 | Shirai et al. | 303/115 |
| 4,500,138 | 2/1985 | Mizusawa et al. | 303/119 X |
| 4,505,520 | 3/1985 | Maehara | 303/111 X |
| 4,508,393 | 4/1985 | Drometer | 303/111 |
| 4,547,022 | 10/1985 | Brearley et al. | 303/6 C |
| 4,585,281 | 4/1986 | Schnürer | 303/116 |

FOREIGN PATENT DOCUMENTS

| 2248181 | 6/1975 | France | 303/6 C |
|---|---|---|---|
| 0038244 | 2/1985 | Japan | 303/6 C |
| 0045455 | 3/1985 | Japan | 303/6 C |
| 2165601 | 4/1986 | United Kingdom | 303/119 |

OTHER PUBLICATIONS

Pp. 193–194 of Bremsen-Handbuch, published 1979.

Primary Examiner—Douglas C. Butler
Attorney, Agent, or Firm—Brumbaugh, Graves, Donohue & Raymond

[57] ABSTRACT

A hydraulic dual-circuit brake system for automobiles, comprising wheel brakes positioned at the front and rear wheels, a master brake cylinder, brake lines for transmitting brake pressure from the master brake cylinder to the wheel brakes to actuate the latter, a brake pressure regulator device incorporating a hydraulically operated switching off device interposed between the rear wheel brakes and the master brake cylinder, and a brake slip regulation device including a hydraulic unit, sensors for providing a signal output representative of wheel movement behavior, and an electronic anti-skid control and regulating device responsive to the signal output for controlling the hydraulic unit to affect the brake pressure transmitted by the hydraulic unit to the switching off endangered wheel brake. The hydraulically operated locking device of the brake pressure regulator device responds to the brake pressure transmitted by the hydraulic unit to the locking-endangered wheel brakes and modifies the operation of the brake pressure regulator device to affect the brake pressure delivered to the rear wheel brakes by the brake pressure regulator device.

2 Claims, 3 Drawing Sheets

HYDRAULIC DUAL-CIRCUIT BRAKE SYSTEM FOR AUTOMOBILES

This application is a continuation of application Ser. No. 719,682, filed on Apr. 4, 1985, now abandoned.

BACKGROUND OF THE INVENTION

The invention relates to a hydraulic dual-circuit brake system for automobiles, particularly passenger cars and, more specifically to systems of this general character having a brake pressure regulator, such as a reducer or limiter, with a hydraulically operated switching off device.

In order to ensure that the rear wheels of an automobile will not lock sooner than the front wheels, it is common practice to distribute the brake forces among the axles of the vehicle in such a manner that the braking effect is more fully utilized at the front axle than at the rear axle. This apportionment offers good directional stability during braking. However, this has the disadvantage that the maximum physically possible vehicle deceleration is not attained since, at least part of the time, a lower braking force is applied at the rear wheels than would be otherwise possible. These apportionment criteria have been reflected in legal requirements.

Due to the aforeindicated brake force distribution, in automobiles equipped with brake slip regulating means, i.e., an anti-skid braking system, for all wheels or all axles of the vehicle, brake slip regulation generally starts first at the wheels of the front axle of the automobile, before the maximum brake forces have been attained at the rear axle. Thus, in many cases, the maximum vehicle deceleration is not attained, even in automobiles provided with such brake slip regulation. It will be attained only when the operator deliberately increases the braking pressure of the brake system by actuating the brake pedal to such a degree that, even though brake slip regulation has already started on the front axle, the maximum brake force, or the brake slip regulation phase respectively, is attained at the rear axle.

In order to have the actual brake force distribution of the motor vehicle approximate the ideal brake force distribution, it is increasingly becoming customary to include in the brake pressure lines leading to the rear wheel brakes, brake pressure regulators, i.e., brake pressure reducers or brake pressure limiters, having a non-linear, kinked characteristic. Depending on the type of brake pressure regulator utilized, the brake pressure effective on the rear wheel brakes, corresponding to the predefined characteristic curve, is either limited to a fixed value or is maintained lower by a predefined value than the brake pressure effective on the front wheel brakes. In consideration of the fact that the ideal brake force distribution will be a function of the load, the brake pressure regulators in most cases are designed so that the kink point of the characteristic curve varies as a function of the load.

A hydraulic dual-circuit brake system incorporating a regulating device for brake slip regulation, i.e., an anti-skid braking system, as well as a load-dependent brake pressure regulator device for effecting the rear wheel brakes is widely known. Such systems are provided by the Audi 5000 type passenger cars.

Also well-known in passenger cars, e.g., of the Audi Quattro and Audi 4000 Quattro type, is a hydraulic dual-circuit brake system of the so-called black-and-white type, in which the front wheel brakes belong to one brake circuit and the rear wheel brakes to another. Such systems incorporate a regulating means for brake slip regulation, i.e., an anti-skid braking system, and having a fixedly set, not load-dependently controlled, brake pressure regulator device with a so-called hydraulically operated switching off device in the brake pressure line leading to the rear wheel brakes. The control inlet of the hydraulically operated switching off device of this brake pressure regulator device is acted on by pressure directed by a control line from the outlet of the master brake cylinder which supplies the front brake circuit independent of the rear brake circuit. Therefore, in case of failure of the front brake circuit due to a leak or some other defect, the reducing or limiting operation of the brake pressure regulator device is rendered ineffective and the pressure reduction or limitation in the rear brake circuit is suspended.

SUMMARY OF THE INVENTION

It is an object of the invention to provide an improved hydraulic dual-circuit brake system for passenger cars of this general character in which the vehicle deceleration on braking is increased during such operating periods of braking where brake slip regulation occurs only on one or both of the front wheels.

In accordance with the invention, the control inlet of the hydraulically operated switching off device of the brake pressure regulator device is not connected directly with the master brake cylinder; rather it is connected to one of the outlets of the hydraulic unit of the anti-skid braking system connected with the brakes of the front wheels. Therefore, the hydraulically operated switching off device of the brake pressure regulator device is no longer acted on by the full, unregulated brake pressure delivered by the master brake cylinder, but rather by the output pressure of the hydraulic unit delivered to the front wheel brakes, which pressure is regulated in case there is danger of locking and is thus lower.

Accordingly, the hydraulically operated switching off device of the brake pressure regulator device is no longer activated only when the front brake circuit fails due to a leak or some other defect, but is also activated when the hydraulic unit of the anti-skid braking system, due to a signalled locking danger of at least one of the front wheels, starts to reduce, i.e., regulate, the brake pressure at the locking-endangered front wheel.

To achieve such a result, the effective piston surface of the hydraulically operated switching off device of the brake device is dimensioned so that the switching off device begins to function at a relatively small pressure difference between the master brake cylinder pressure, which is delivered to the brake pressure regulator device for the rear wheels, and the regulated front wheel or axle pressure. Consequently, the reducing or limiting operation of the brake pressure regulator device is blocked and the brake pressure delivered by the master brake cylinder to the rear brake circuit is not reduced.

It is advantageous to join the control inlet of the hydraulically operated switching off device of the brake pressure regulator device with the outlet of the hydraulic unit associated with the right front wheel brake because it is highly probable that brake slip regulation will start first at the right front wheel.

In case of hydraulic dual-circuit brake systems having diagonally divided brake circuits and one brake pressure regulator device with a hydraulically operated switching off device positioned in each of the brake pressure lines leading to the rear wheel brakes, it is advantageous to join the control inlet of the hydraulically operated switching off device of each brake pressure regulator device with the outlet of the hydraulic unit connected with the diagonally opposite front wheel brake.

The hydraulic dual-circuit brake system of the invention offers the essential advantage that vehicle deceleration on braking and start of brake slip regulation on the front wheels is increased in comparison with the customary vehicles of this kind without the need for additional equipment. The improved performance is achieved merely by slightly modifying the layout of the hydraulic lines.

A further advantage of the present invention is the fact that the means provided function in a manner which corresponds, at least in its essential aspects, to the manner of functioning of a brake system utilizing comparatively costly, load-dependently controllable brake pressure regulator devices.

BRIEF DESCRIPTION OF THE DRAWINGS

The invention will be more fully explained in the following description of the preferred embodiment, as represented in the accompanying drawings, in which.

DESCRIPTION OF THE PREFERRED EMBODIMENT

Figure 1:
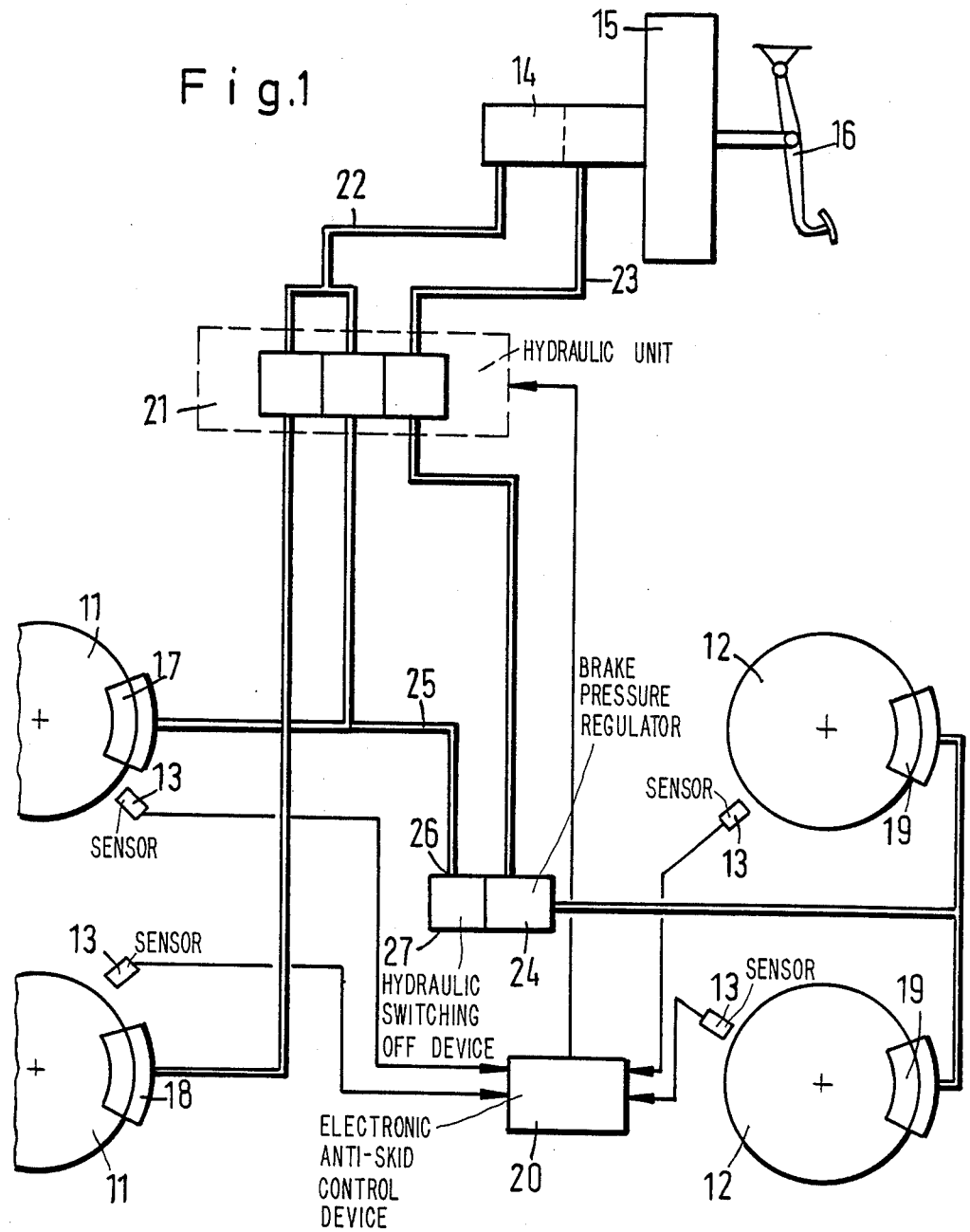
FIG. 1 is a simplified block diagram of a hydraulic dual-circuit brake system according to the invention.

The motor vehicle hydraulic brake system illustrated in FIG. 1 is a dual-circuit brake system, where the brakes 17 and 18 on the front wheels 11 form part of a first brake circuit which is supplied via a brake line 22 and the brakes 19 on the rear wheels 12 form part of a second brake circuit which is independent of the first brake circuit and supplied via a brake line 23. Correspondingly, a dual-circuit master brake cylinder 14, e.g., a tandem cylinder, is adapted to be actuated by an operator of the motor vehicle depressing a brake pedal 16. In the preferred embodiment, the master brake cylinder is not actuated directly but rather with interposition of a known brake servo unit 15, i.e., a hydraulic brake servo unit or a vacuum-actuated brake servo unit.

The hydraulic brake system is provided with a known regulating device for brake slip regulation, i.e., an anti-skid braking system, which includes an electronic anti-skid control or regulating device 20, sensors 13 associated with vehicle wheels 11 and 12 for determination of the conditions of wheel motion, and a hydraulic unit 21 which is interposed between the master brake cylinder 14 and the brakes 17, 18 and 19.

The hydraulic unit 21 is controlled by the electronic anti-skid control or regulating device 20 in a known manner such that the brake pressure of at least the wheel signalled to be locking-endangered is at least maintained constant or reduced for such time as the danger of locking continues. Since many forms of regulating devices for brake slip control are known, it will not be necessary to describe the electronic anti-skid control or regulating device and the hydraulic unit in detail.

In the brake line 23 leading from the master brake cylinder 14 to the brakes 19 on the rear wheels 12 is disposed a well known brake pressure regulator device 24, i.e., a pressure-dependent reducer or limiter, with a hydraulically operated switching off device 27, by which its reducing or limiting function can be switched off (made ineffective). The construction and operation of such a brake pressure regulator device is well known in the prior art. A control inlet 26 of the hydraulically operated switching off device is in communication via a control line 25 with the outlet of the hydraulic unit 21 which is connected to the brake on the right front wheel.

During the operating periods in which no locking danger is recorded on braking, the dual-circuit brake system operates in the customary manner. The full brake pressure supplied by the master brake cylinder 14 as a result of actuation of the brake pedal 16 is delivered to the front wheel brakes 17 and 18 via the brake line 22. The front wheel brakes receive full brake pressure because the hydraulic unit 21 is inoperative during these operating periods. In contrast thereto, the rear wheel brakes 19 are acted on via the brake line 23 by a brake pressure which, in accordance with the characteristics of the interposed brake pressure regulator device 24, is, as necessary, either reduced or limited relative to the output pressure of the master brake cylinder.

Figure 2:
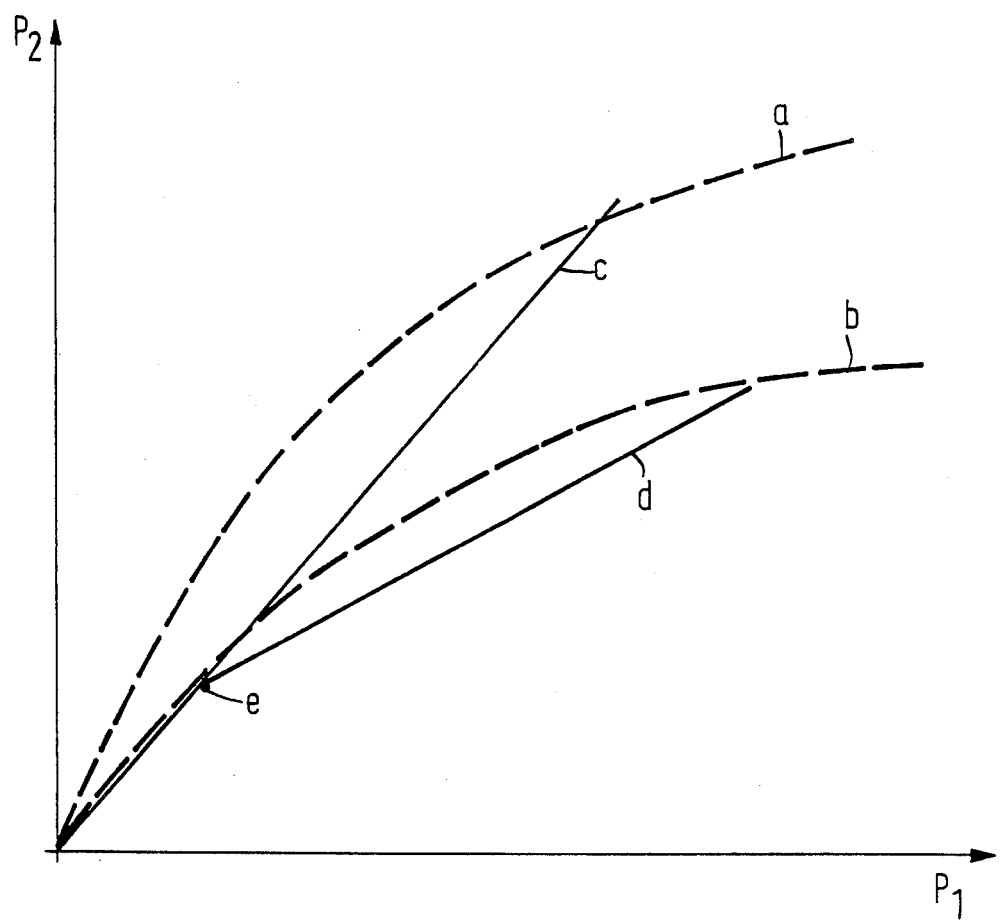
FIG. 2 is a diagram which represents the brake pressure for the rear wheel brakes as a function of the brake pressure delivered by the master brake cylinder.
Figure 3:
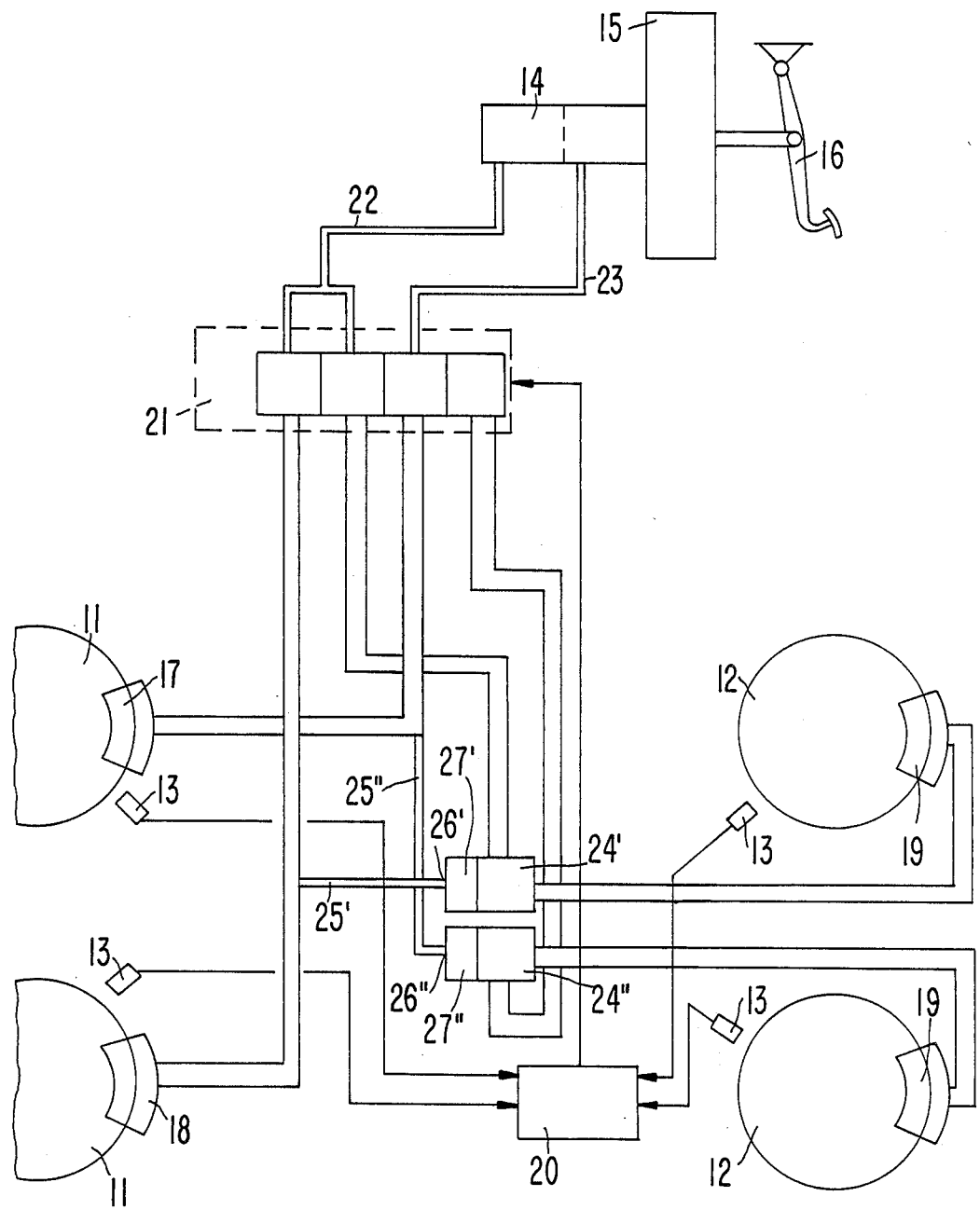
FIG. 3 is an alternative embodiment of a brake system according to the invention.

FIG. 2 illustrates by way of example typical characteristics of a fixedly set, pressure-dependent brake pressure regulator device of the reducing type. This figure qualitatively represents the ideal brake pressure distribution of a motor vehicle by broken-line curves. $P_2$ represents the brake pressure acting on the brakes on the rear wheels 12 and $P_1$ represents the brake pressure delivered by the master brake cylinder 14. The limit curve for the "full load" condition is designated by a and the limit curve for the "no load" condition is designated by b. The actual brake force distribution of an automobile equipped with a pressure-dependent brake pressure regulator device of the reducing kind is qualitatively indicated by solid lines. The branch characteristic c represents the non-reduced output pressure of the master brake cylinder 14. The branch characteristic d represents the output pressure reduced by the brake pressure regulator device. The kink point of the characteristic curve is marked by e.

Provided no defect exists in the front brake circuit 22, the full hydraulic pressure supplied by the master brake cylinder 14 will be present at the control inlet 26 of the hydraulically operated switching off device 27 of the brake pressure regulator device 24 and the latter will carry out its reducing operation in the customary manner. Accordingly, when the pressure $P_1$ delivered by the master brake cylinder assumes a value which is greater than $P_1$ at the kink point e in FIG. 2, the rear wheel brakes 19 receive a reduced pressure which, in accordance with the characteristic gradient d in FIG. 2, is in a defined relationship with the pressure supplied by the master brake cylinder.

However, if and when the sensors 13 indicate a danger of locking of the front wheels 11, the electronic anti-skid control and regulating device 20 actuates the hydraulic unit 21 in such a manner that the brake pressure delivered to the lock-endangered wheel, e.g., the right front wheel, is reduced as necessary or at least kept constant. The hydraulically operated switching off device 27 of the brake pressure regulator device 24 is actuated whenever and for as long as the pressure difference between the brake pressure delivered to the said front wheel via the control line 25 and the brake pressure delivered to the brake pressure regulator device 24 via the brake line 23 exceeds a predetermined value fixed by the dimensioning of the brake pressure regulator device. Due to the connection of the hydraulically operated switching off device 27, the reducing operation of the brake pressure regulator device is interrupted and the brake pressure delivered to the rear wheel brakes 19 is increased from the value previously appearing on the branch characteristic d to the corresponding value appearing on the branch characteristic c. Therefore, the invention increases the brake force exerted on the rear wheels, which advantageously increases the deceleration of the vehicle.

This operation continues as long as a brake slip regulation of the front wheels occurs, i.e., as long as the aforementioned difference in pressure is effective on the hydraulically operated switching off device 27 of the brake pressure regulator device.

In the event that the sensors 13 associated with the rear wheels 12 signal to the electronic anti-skid control and regulating device 20 the danger of locking of at least one of the rear wheels, because of suspension of the reducer function of the brake pressure regulator device 24, the electronic anti-skid control and regulating device 20 triggers a brake slip regulation of the rear wheels. The portion of the hydraulic unit 21 in communication with the brake line 23 is activated in a known manner to effect the brake slip regulation of the rear wheels.

Although the invention has been described in detail with reference to its presently preferred embodiment, it will be understood by one of ordinary skill in the art that various modifications can be made without departing from the spirit and scope of the invention. The latter is intended to encompass all such modifications falling within the scope of the appended claims.

I claim:

1. A hydraulic dual circuit brake system for automobiles, in particular passenger cars having front and rear wheels, comprising:
   wheel brake means positioned at the front and rear wheels for arresting wheel motion;
   a master brake cylinder;
   a plurality of brake lines for transmitting brake pressure from the master brake cylinder to the wheel brake means to actuate the latter;
   brake pressure regulator means incorporating hydraulically operated switching off means with a hydraulic control inlet for switching off a reducing or limiting function of the brake pressure regulator means, said brake pressure regulator means being interposed between the wheel brake means for the rear wheels and the brake lines for transmitting brake pressure from the master brake cylinder thereto;
   brake slip regulation means, including:
   hydraulic means interposed between the master brake cylinder and the front and rear wheel brake means;
   sensor means at each of said front and rear wheels responsive to wheel movement behavior for providing a sensor signal output representative of the wheel movement behavior; and
   electronic anti-skid control and regulating means responsive to the sensor signal output for controlling the hydraulic means to affect the brake pressure transmitted by the hydraulic means on a locking-danger condition of at least one wheel, characterized in that
   the hydraulic control inlet of the hydraulically operated switching off means of the brake pressure regulator means is connected to said hydraulic means between said master brake cylinder and the rear wheel brake means and responsive to the brake pressure transmitted by the hydraulic means to the right front wheel brake means when danger of locking is detected by the anti-skid control and regulating means so as to modify the operation of the brake pressure regulator means to affect the brake pressure delivered to the brake means for the rear wheel, the electronic anti-skid control and regulating means being provided so as to control the hydraulic means to lower or maintain constant the brake pressure transmitted to the locking-endangered wheel brake means when the sensor means provides a sensor output signal which indicates that a front wheel is locking-endangered, said hydraulically operated switching off means being responsive to the lower brake pressure by modifying operation of the brake pressure regulator means to increase the brake pressure delivered to the rear wheel brake means.

2. A hydraulic dual-circuit brake system as defined in claim 1, and further comprising a first brake circuit means including the right front wheel brake means and left rear wheel brake means, and a second brake circuit means including the left front wheel brake means and the right rear wheel brake means, the brake force distribution means further including means for independently transmitting brake pressure to the right rear and left rear wheel brake means, and the hydraulically operated switching off means further includes means responsive to the brake pressure transmitted by the hydraulic means to each front wheel brake means for modifying the operation of the brake pressure regulator means to affect the brake pressure delivered to the diagonally opposite rear wheel brake means.

* * * * *

UNITED STATES PATENT AND TRADEMARK OFFICE
CERTIFICATE OF CORRECTION

PATENT NO. : 4,740,039
DATED : April 26, 1988
INVENTOR(S) : Peter Hattwig

It is certified that error appears in the above-identified patent and that said Letters Patent is hereby corrected as shown below:

```
First page, Item 73, "Volkswagenwerk" should read
--Volkswagen--.
```

Signed and Sealed this

Eleventh Day of April, 1989

Attest:

DONALD J. QUIGG

Attesting Officer

Commissioner of Patents and Trademarks